March 22, 1938. A. DAHLBERG ET AL 2,111,842
PRECISION BALANCE
Filed Jan. 12, 1937
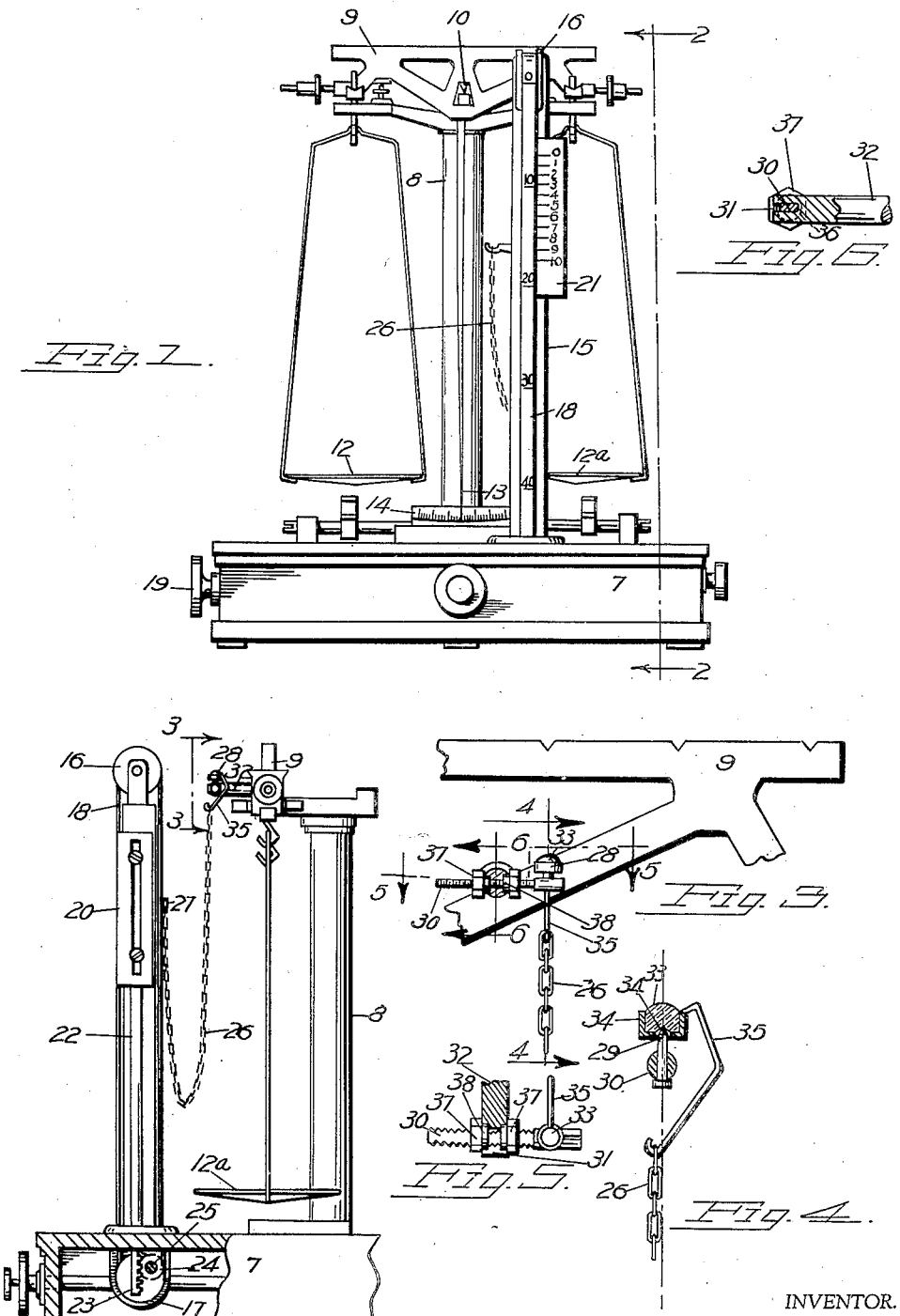
INVENTOR.
ALBERT DAHLBERG and
GORDON S. CLAYSON
BY
ATTORNEY.

Patented Mar. 22, 1938

2,111,842

UNITED STATES PATENT OFFICE 2,111,842

PRECISION BALANCE

Albert Dahlberg, Los Angeles, Calif., and Gordon S. Clayson, Denver, Colo., assignors to Wm. Ainsworth & Sons, Inc., Denver, Colo., a corporation of Colorado Application January 12, 1937, Serial No. 120,200

3 Claims. (Cl. 265—60)

This invention relates to improvements in balances, and more particularly relates to improvements in the suspension of a weighing chain used in analytical balances of the precision type.

It is an object of the present invention to provide a substantially frictionless suspension of a weighing chain of an analytical balance.

A further object of the invention is to control the position of the suspension-element of a weighing chain in order that such element will be out of contact with any structure which would add a friction-component to its weighing function.

Another object of the invention is the provision of a suspension means which is adapted for use at the live end of weighing chains of various types of precision balances.

A still further object of the invention is to provide a simple, durable and efficient suspension-element for weighing chains which is easily operated.

Other objects reside in novel details of construction and novel combinations and arrangements of parts as will more fully appear in the course of the following description.

In many analytical balances, of the precision type, a chain composed of links of substantially uniform weight is suspended in a catenary curve between an arm of the beam of the balance opposite from its end on which the load pan is carried, and an adjustable carrier.

The end of the chain carried by the beam is the live end, while the end suspended from the adjustable carrier is the dead end.

Various types of suspension systems for such weighing or counterbalancing chains have been used in the art. In all such systems, at present known, the live end of the chain is carried by a hook hung over a fixed arm on the balance beam with the live end of the chain disposed in vertical alinement with the bearing surface of the hook.

The present invention includes the use of a jewel bearing supported on a pointed pivot with the weighing chain suspended therefrom through the intermediary of a hook. This construction almost completely eliminates friction in the suspension of the chain and thereby adds to the precision of the balance.

An embodiment of the invention has been illustrated in the accompanying drawing in the several views of which like parts are similarly designated and in which, Figure 1 represents a front view of a precision balance to which the present invention has been applied;

Figure 2 is a view, partially in section, looking in the direction of the arrows 2—2, Figure 1;

Figure 3 is a partially broken side view drawn to an enlarged scale of the beam of the balance looking in the direction of the arrow 3 in Figure 2, showing the suspension of the weighing chain from the beam;

Figure 4 is a section taken along the line 4—4, Figure 3;

Figure 5 is a sectional view of the suspension-element illustrated in Figure 3, taken approximately on the line 5—5, Figure 3; and Figure 6 is a section taken along the line 6—6, Figure 3;

In the drawing, the invention has been illustrated as applied to a balance of the type shown in Ainsworth Patent No. 2,022,306, but it will be appreciated that the present invention may be applied to all types of precision balances employing a counterbalancing chain.

Referring further to the drawing, the balance is provided with a conventional hollow base 7, a column 8 on the base, a beam 9 fulcrumed at 10 on the upper end of the column with pans 12 and 12a suspended from its opposite ends, and a pointer 13 carried by the beam and cooperating with a scale 14 at the lower end of the column.

A scale of this character will have, in addition to the foregoing which constitute its principal elements, various adjustments, movement-arresting devices and other appurtenances, all of which are well-known in the art, and since such appliances do not constitute a part of the present invention and differ in form and arrangement in various scales, detailed description of the same appears unnecessary.

It will also be understood that scales of this type are glass-enclosed, which feature has not been illustrated in the drawing.

The equilibrating element of the balance illustrated in Figure 1 comprises a hollow column 15 mounted on the base forward of the structure previously described, and provided at its ends with two flanged sheaves 16 and 17, (Figure 2) supporting a flexible tape 18, preferably made of steel, which serves as the adjustable element for changing the length of the dead end of the chain, and also serves as the movable scale of the weighing system.

A spring-mounting for the upper sheave 16 provides the required tension for the tape. Vertical movement of the tape is effected from outside the base by means of a knob 19 at the end of a shaft upon which the lower sheave 17 is fixed, the shaft being rotatably supported in suitable bearings inside the base of the instrument.

A vernier-plate 21 is mounted for vertical movement on column 15, its face being alined with the scale-bearing face of tape 18. The plate 21 is fastened on a slotted carrier 20 fixed at the end of a rod 22 which passes through an opening of the base. The lower portion of the rod is toothed to provide a rack 23, which is engaged by a pinion 24 on a shaft 25 rotatably mounted in suitable bearings inside the base.

The chain, constituting the variable weight of the instrument, is designated by the reference numeral 26, and has its dead end suspended from a hook 27 which extends laterally from the tape 18 at the rear side of column 15, the ends of the tape being held together by a suitable fastening device.

The suspension-element for the live end of the chain, which constitutes the principal feature of the present invention, comprises a jewel bearing member 28 resting on a vertically-disposed, pointed pivot 29 carried at one end of a horizontally-disposed support 30 mounted for selective lengthwise movement in a recess 31 at an end of an arm 32 fixed on the balance beam 9.

The bearing-member 28, as best shown in Figure 4, comprises a jewel 33 having centrally of its bottom a recessed bearing surface which admits the point of the pivot 29 into engaging relation therewith. A band 34 on the jewel carries a hanger or hook 35, on the free end of which the live end of chain 26 hangs.

Due the the fact that in most balances the dead end of the chain is suspended at a distance laterally from the support of the pivot 29, there is a transverse component of force acting on the live end of the chain, in addition to the gravitational force.

As a result, the hook 35 of the present invention would have a tendency to swing about the pivot 29, and in so doing, would frequently come to rest against the arm 32 or pivot support 30, thereby introducing a friction factor into the counterbalancing chain.

To avoid such deleterious effects, a position control of the hook 35 is introduced into the bearing-member, by suspending the chain from the hook at a point out of vertical alinement with the axis of the pivot, as indicated by the dotted lines in Figure 4. It has been discovered that when such an arrangement is employed, the hook will come to rest after each adjustment of the chain, in a plane which intersects the lengthwise axis of the support 30 at substantially right angles, and in this way the friction factor is eliminated.

To improve the precision of the instrument, most balances are designed so that the point of suspension of the live end of the chain may be moved toward or away from the fulcrum 10 of the beam, in initially establishing the equilibrium of the counterbalancing chain.

In the present invention, the pivot support 30 is designed to perform this function and incorporates certain novel construction features which facilitate and improve the aforesaid adjustment.

To this end, the support 30 is formed by a flattened screw which is extended through the recess 31 in arm 32. This recess (Figures 3, 5 and 6) is in the form of a slot 36 at the end of arm 32 and is of cylindrical shape at opposite sides of arm 32 adjacent its slotted end, as indicated in dotted lines in Figure 6.

Lock nuts 37, each having a narrowed projection 38 at one end, are threaded on screw 30 with the projection 38 extending into the cylindrical portion of recess 31.

This countersunk arrangement permits quick adjustments to effect lengthwise movement of screw 30 without danger of its slipping out of recess 31 through slot 36. Minute variations in position are easily and accurately accomplished in this way.

From the foregoing, it will be apparent that the position of the pivot 29 relative to fulcrum 10 can be accurately selected in initially establishing equilibrium of the system.

The jewel-bearing suspension of the live end of the chain reduces friction to a minimum, and the position control of the bearing-member 28 insures against adding a friction factor through the accidental engagement of the hook 35 with the arm 32 or support 30.

Each change in length of the chain may cause some movement of the bearing-member, but it immediately positions itself in the manner above-described after such adjustment, and uniformly accurate readings may be taken without special attention being given to the condition of the weighing chain.

Since the operation of precision balances of the type described is well-known in the art, detailed description of the entire weighing operation appears unnecessary.

While the present invention has been described with reference to its preferred arrangement of parts, it will be understood that various changes in construction may be adopted without departing from the fundamental principles of its operation.

For example, any means of suspending the chain from the jewel out of engagement with other parts will be satisfactory for reducing friction to a minimum, and so long as the live end of the chain extends in a plane not in alinement with the lengthwise axis of the vertical pivot, the positioning feature will be present.

In the description and claims, the terms "vertical" and "horizontal" are used in the broader sense of indicating a position generally, and are not intended to be limited to the exact mathematical definition, it being understood that minor variations from a mathematical vertical or horizontal position would not appreciably alter the operation desired.

Therefore, changes and modifications may be availed of within the spirit and scope of the invention, as defined in the hereunto appended claims.

What we claim and desire to secure by Letters Patent is:—

1. The combination with a precision balance, including a scale beam and a counterbalancing chain, of a suspension-element for the live end of the chain, comprising a pivot carried by the scale beam, and a bearing-member resting on the pivot in suspending connection with said chain, at a point out of vertical alinement with the pivot, and means for suspending the dead end of the chain at a point laterally spaced from the pivot.

2. The combination with the counterbalancing chain of a precision balance, of a suspension-element for the live end of the chain, comprising a vertically disposed pivot carried by the scale beam, a bearing-member resting on the pivot, and a hanger in suspending connection with said chain, at a point spaced from the lengthwise axis of the pivot, and means for suspending the dead end of the chain at a point transversely of the pivot.

3. The combination with a precision balance, including a scale beam and a counterbalancing chain, of an arm projecting from the scale beam and having a transverse cylindrical aperture and a therewith-connecting slot of lesser diameter, a screw movable lengthwise in said aperture, flattened to move through the slot, and having means for suspending connection with the counterbalancing chain, and lock nuts on the screw at opposite sides of the arm, partially extending into the aperture for holding the screw within the recess during selective lengthwise movement thereof.

ALBERT DAHLBERG.
GORDON S. CLAYSON.